(12) United States Patent
Falk (10) Patent No.: US 11,075,601 B2
(45) Date of Patent: Jul. 27, 2021

(54) SOLAR MODULE, OPERATING METHOD FOR A SOLAR MODULE, AND PHOTOVOLTAIC SYSTEM

(71) Applicant: SMA Solar Technology AG, Niestetal (DE)

(72) Inventor: Andreas Falk, Kassel (DE)

(73) Assignee: SMA Solar Technology AG, Niestetal (DE)

( * ) Notice: Subject to any disclaimer, the term of this patent is extended or adjusted under 35 U.S.C. 154(b) by 429 days.

(21) Appl. No.: 15/905,002

(22) Filed: Feb. 26, 2018

(65) Prior Publication Data

US 2018/0191293 A1 Jul. 5, 2018

Related U.S. Application Data

(63) Continuation of application No. PCT/EP2017/056919, filed on Mar. 23, 2017.

(30) Foreign Application Priority Data

Mar. 31, 2016 (DE) ...................... 10 2016 105 930.7

(51) Int. Cl.
*H02S 40/34* (2014.01)
*H02J 3/38* (2006.01)
*H02H 3/16* (2006.01)
*H02S 40/36* (2014.01)
*H02H 7/20* (2006.01)

(52) U.S. Cl.
CPC .............. *H02S 40/34* (2014.12); *H02H 3/16* (2013.01); *H02H 7/20* (2013.01); *H02J 3/383* (2013.01); *H02S 40/36* (2014.12); *Y02E 10/56* (2013.01)

(58) Field of Classification Search
CPC .. H02H 3/16; H02H 7/20; H02S 40/34; H02S 40/36; H02J 3/383; Y02E 10/563
USPC .......................................................... 361/42
See application file for complete search history.

(56) References Cited

U.S. PATENT DOCUMENTS

| | | | |
|---|---|---|---|
| 7,443,052 B2 | 10/2008 | Wendt et al. | |
| 8,139,335 B2 | 3/2012 | Quardt et al. | |
| 8,502,416 B2 | 8/2013 | Falk | |
| 2009/0207543 A1* | 8/2009 | Boniface | H02H 3/16 361/86 |

(Continued)

FOREIGN PATENT DOCUMENTS

EP 2355170 A2 8/2011

OTHER PUBLICATIONS

International Search Report dated Jun. 20, 2017 for International Application PCT/EP2017/056919.

*Primary Examiner* — Kevin J Comber
(74) *Attorney, Agent, or Firm* — Eschweiler & Potashnik, LLC (57) ABSTRACT

A solar module includes one or more photovoltaic (PV) modules, a short-circuit switch connected in parallel with at least one of the one or PV modules, and a control unit connected in parallel with the short-circuit switch. The at least one of the one or more PV modules supplies electrical power to the control unit and is connectable via a first and a second module terminal to further solar modules to form a string. The control unit is configured to actuate the short-circuit switch depending on an insulation voltage dropped between a ground potential reference terminal of the solar module and one of the first and second module terminals.

12 Claims, 5 Drawing Sheets

(56) References Cited

U.S. PATENT DOCUMENTS

| | | | |
|---|---|---|---|
| 2011/0068633 A1* | 3/2011 | Quardt | H01L 31/02021 307/77 |
| 2014/0347770 A1* | 11/2014 | Falk | H02H 3/16 361/42 |
| 2016/0006392 A1 | 1/2016 | Hoeft | |
| 2019/0044323 A1* | 2/2019 | Deline | H02S 40/36 |

* cited by examiner

SOLAR MODULE, OPERATING METHOD FOR A SOLAR MODULE, AND PHOTOVOLTAIC SYSTEM

CROSS-REFERENCE TO RELATED APPLICATIONS

This application claims priority to PCT Patent Application No. PCT/EP2017/056919, filed on Mar. 23, 2017, which claims priority to German Patent Application Number DE 10 2016 105 930.7, filed on Mar. 31, 2016, which are hereby incorporated by reference in their entirety.

FIELD

The disclosure relates to a solar module, an operating method for a solar module and a photovoltaic system (PV system) with a series connection of solar modules.

BACKGROUND

PV modules are connected to form strings of ever-greater length for the economical generation of electrical energy with the aid of these PV modules. Safety circuits are required in order to make the voltage of the string, which rises with the growing string length, manageable. It is thus for example usual, and described in document EP2296244 A1, for long strings to be connected to ground potential in the center of the string, and to monitor the current flowing through the ground connection as a fault current. If the current exceeds a threshold value a ground fault is to be assumed, and the system is placed into a safe state, for example by separating the PV modules from one another and/or by disconnecting the string from the connected inverter. A disconnection of the string from the inverter can also be triggered by the total string voltage exceeding a threshold value in order to protect the inverter from damage.

It is proposed in document DE102010009120 A1, as an alternative to disconnecting the string from the inverter, that a part of the string is short-circuited through a switch if the string voltage exceeds a critical value. In this way it is possible for the remaining string to continue to be connected to the inverter and for the photovoltaic system to produce energy. This solution, however, entails an increased installation expense due to the provision of the additional short-circuit path and its control.

SUMMARY

The disclosure provides solar modules for strings which, with the aid of a protective circuit, autonomously ensure compliance with a maximum voltage of any desired part of the solar module with respect to ground potential, also known as the common mode (CM) voltage, without additional cabling effort of the string being required. It is furthermore desirable for the solar module to also autonomously ensure compliance with a maximum total voltage in a string of solar modules, also known as the differential mode (DM) voltage.

In one aspect according to the disclosure, a short-circuit switch and a control unit are each connected in parallel with at least one part of a solar module, wherein the solar module electrically powers the control unit, and is connectable via a first and a second module terminal to further solar modules to form a string. The control unit is configured to actuate the short-circuit switch depending on a voltage, the so-called insulation voltage, dropped between a ground potential reference terminal of the solar module and one of the module terminals. The short-circuit switch and the control unit can here be connected in parallel with the same part of the solar module, in particular including the entire solar module, or with different, including overlapping, but in particular also complementary parts of the solar module.

In an advantageous embodiment, the control unit is configured to actuate the short-circuit switch depending on a module voltage dropped across the module terminals. Included in the concept of module voltage are voltages that are dropped and measured across a part of the solar module, and which therefore are representative of the voltage dropped across the module terminals.

In one embodiment, the solar module comprises a series connection of a first partial module and a second partial module, wherein the short-circuit switch is connected in parallel with the second partial module and the control unit is connected in parallel with the first partial module. In this configuration, the control unit is permanently electrically powered by the first partial module, and can permanently measure the module voltage at the latter. When necessary, the second partial module can be short-circuited by the control unit, so that only the voltage of the first partial module is still present between the module terminals, and the measurement of the module voltage is not affected by the short-circuiting of the second partial module.

In order to reduce the voltage between the module terminals further, an additional short-circuit switch operated by the control unit can be connected in parallel with the first partial module. In this way, when necessary, the entire solar module can be short-circuited by the short-circuit switch of the second partial module and the additional short-circuit switch of the first partial module. A buffer store integrated into the control unit can provide the electrical power to the control unit during the phase in which the additional short-circuit switch is closed and no energy can therefore be taken from the first partial module. The buffer store can here be recharged by a repeated brief opening, or partial opening in a linear operating mode, of the additional short-circuit switch.

Within the string, the solar module according to the disclosure can autonomously detect when an operating situation is reached in which the value of the voltage present at the string, in particular insulation voltages with respect to ground potential, could lie outside a permissible range. In such a case, the solar module according to the disclosure can autonomously reduce the voltage dropped across it, so that the voltage values are returned again into a permissible range, or that the permissible range is not even left in the first place. It is possible in this way to interconnect solar modules to form a longer string than would be possible with conventional solar modules without there being the risk of infringing voltage specifications, in particular specifications for insulation voltages that must be observed.

It is furthermore possible, even in the case of an earth fault, to satisfy the maintenance of specifications for insulation voltages within the string with a larger number of series-connected solar modules than would be possible with conventional solar modules, since the solar modules according to the disclosure also react in the case of a shift in potential due to a ground fault, and autonomously reduce their voltage. Due to the autonomous reaction of the solar modules according to the disclosure to such operating situations, the maintenance of the voltage specifications can even be ensured when, as a result of a fault, a single solar module is unable to short-circuit its partial modules. In particular when a large number of strings are connected in parallel, strings that have autonomously reduced their voltage act as consumers for other strings who have not reduced their voltage as a result of a fault, and so reduce the total voltage of the solar field. This makes the system very robust, since the failure of individual partial circuits does not lead to the failure of the system.

Since the solar modules according to the disclosure autonomously detect operating situations in which a reduction of the string voltage is necessary, communication between the solar modules, or between a solar module and a central communication unit, is not necessary. The possibility of providing such a communication is, of course, not excluded, in particular in order to be able to effect the reduction of the voltage in this way too, or to communicate the triggering of the protection equipment.

In one embodiment, the series connection of the solar module consists exclusively of the first and second partial module. In an alternative embodiment, the series connection comprises at least one further partial module, with which a further short-circuit switch is connected in parallel, wherein the control unit is configured to actuate the further short-circuit switch depending on the module voltage and/or the insulation voltage. In this way, the control unit can selectively short-circuit selected partial modules, or all of them, using the short-circuit switches assigned to them, and thus reduce the voltage of the solar module according to need. For example, different threshold values for the closing of the short-circuit switch and of the further short-circuit switch can be stored in the control unit, so that the short-circuit switch and the further short-circuit switch are actuated at different times or under different voltage conditions, and a step-wise lowering of the voltage of the solar module is thus enabled. The control unit can, in particular, be configured to always also close the further short-circuit switch when it closes the short-circuit switch. It is however, of course, also conceivable that the control unit actuates all the short-circuit switches of the solar module with a common switching signal. It can be appropriate for the further short-circuit switch to be controlled depending only on the insulation voltage and/or the short-circuit switch to be controlled depending only on the module voltage.

In an advantageous form of embodiment, a first threshold value is stored in the control unit, wherein the control unit is configured to close the further short-circuit switch when the insulation voltage exceeds the first threshold value. In this way, when operating, the voltage of the solar module is reduced in that the solar module or other parts of the string exhibit a voltage that is sufficiently high with respect to the ground potential that the insulation of the solar module concerned can be damaged.

In addition or alternatively, a second threshold value can be stored in the control unit, wherein the control unit is configured to close the short-circuit switch when the module voltage exceeds the second threshold value. The module voltage can be regarded as representative for the string voltage, for which reason the first threshold value is, in one embodiment, selected such that the short-circuit switch is closed when there is a risk of an excessively high string voltage, for example during high irradiation, low temperature or in a curtailed state of an energy generation plant that comprises the string. Advantageously, the module voltage is the voltage dropped across the first partial module, so that the module voltage does not depend on whether short-circuit switches of the solar module are closed. Determining the module voltage as the voltage dropped over a plurality of partial modules or over the entire solar module is not, however, ruled out.

The first and/or the second threshold value can be stored as fixed values in the control unit, or the control unit is configured to adapt one of the threshold values depending on the other threshold value. In the latter case, in particular also when a high string voltage and an earth fault are present simultaneously, an energy generation plant comprising the solar modules according to the disclosure can be operated safely and without the risk of damage.

In a further aspect of the disclosure, a photovoltaic system comprises a series connection of solar modules according to the disclosure as described above. The series connection of the solar modules can form a string of the photovoltaic system. It is both conceivable here that all the solar modules of a string are solar modules according to the disclosure or that an arbitrary grouping of solar modules according to the disclosure and conventional solar modules form the string. In the latter case, the solar modules according to the disclosure are, in one embodiment placed at the edge of the string, while the center of the string is formed by conventional solar modules. This arrangement reflects the fact that, in the event of an earth fault, it is the outermost solar modules of a string that are first to infringe specified voltage thresholds with respect to ground potential. The arrangement of the solar modules according to the disclosure in this region of the string have the result that in such a case the string voltage is effectively lowered.

Through the use of solar modules according to the disclosure it is possible to equip a photovoltaic system with a string which, due to its length, exhibits an open-circuit voltage that is larger than the maximum permissible input voltage of an inverter of the photovoltaic system, without it being necessary to disconnect the inverter from the string by means of an isolating switch when insufficient power is being drawn from the string. In the event of an insufficient power withdrawal, the string voltage does indeed rise, but can be reduced through a suitable choice of the second threshold value stored in the control units sufficiently far for it to remain under the maximum permissible input voltage of the inverter. It is thus even conceivable that the isolating switch between the string and the inverter is omitted.

In a further aspect of the disclosure, an operating method for a solar module with two module terminals through which the solar module is connectable to further solar modules to form a string, and a ground potential reference terminal, comprises a measurement of an insulation voltage between the ground potential reference terminal of the solar module and one of the module terminals by means of control unit and a short-circuiting of at least a part of the solar module by means of the control unit depending on the insulation voltage. The control unit is here electrically powered by the solar module.

Advantageously, the operating method further comprises a measurement of a module voltage between the module terminals by means of the control unit and a short-circuiting of at least a part of the solar module by means of the control unit depending on the module voltage.

In one embodiment the control unit is configured to distinguish between at least three conditions depending on the insulation voltage and the module voltage, wherein in a first condition, no short-circuiting of the solar module takes place, in a second condition, the short-circuiting of a part of the solar module takes place, and in a third condition, the short-circuiting of the entire solar module takes place. In this way, the control unit can reduce the voltage between the module terminals of the solar module as far as necessary according to need.

For reasons of easy configuration, it is desirable in one embodiment to fit the solar modules according to the disclosure of a string with identically configured control units. Through this, all the control units of the string would reduce the voltage of the corresponding solar module under the same local conditions. To optimize the safety function with respect to overvoltage it would, however, be advantageous in one embodiment to make the configuration of the control units, in particular the specification of the first and second threshold value, dependent on the position of the solar module within the string. In order to be able to achieve both aims, it is advantageous to enable the solar modules to determine their position within a string autonomously, and to choose their configuration, in particular the first and the second threshold value, depending on the position determined. For this purpose, following installation, the solar modules are first operated in a setting phase, in which they merely repeatedly detect pairs of values of the insulation voltage and the module voltage during the operation of the solar module, and use them for determination of correlations between these voltage values. Correlations that can be determined in these pairs of values are a function of the position of the solar module in the string. It can thus be expected that, for example, solar modules at the outer end of a string exhibit significantly greater values of insulation voltage at a comparable module voltage than solar modules in the middle of the string. After completion of the setting phase, values for the first and second threshold value can be chosen depending on the correlations determined. A short-circuiting of partial modules of the solar modules according to the disclosure by their control units is, in one embodiment, avoided during the setting phase, or at least is restricted to safety-critical operating cases, and is only activated thereafter using the individual threshold values that have been determined. The setting phase should have a duration that ensures that a sufficient bandwidth of operating states is covered, for example one or a few months.

BRIEF DESCRIPTION OF THE DRAWINGS

The disclosure is illustrated below with the aid of figures, in which.

DETAILED DESCRIPTION

Figure 1:
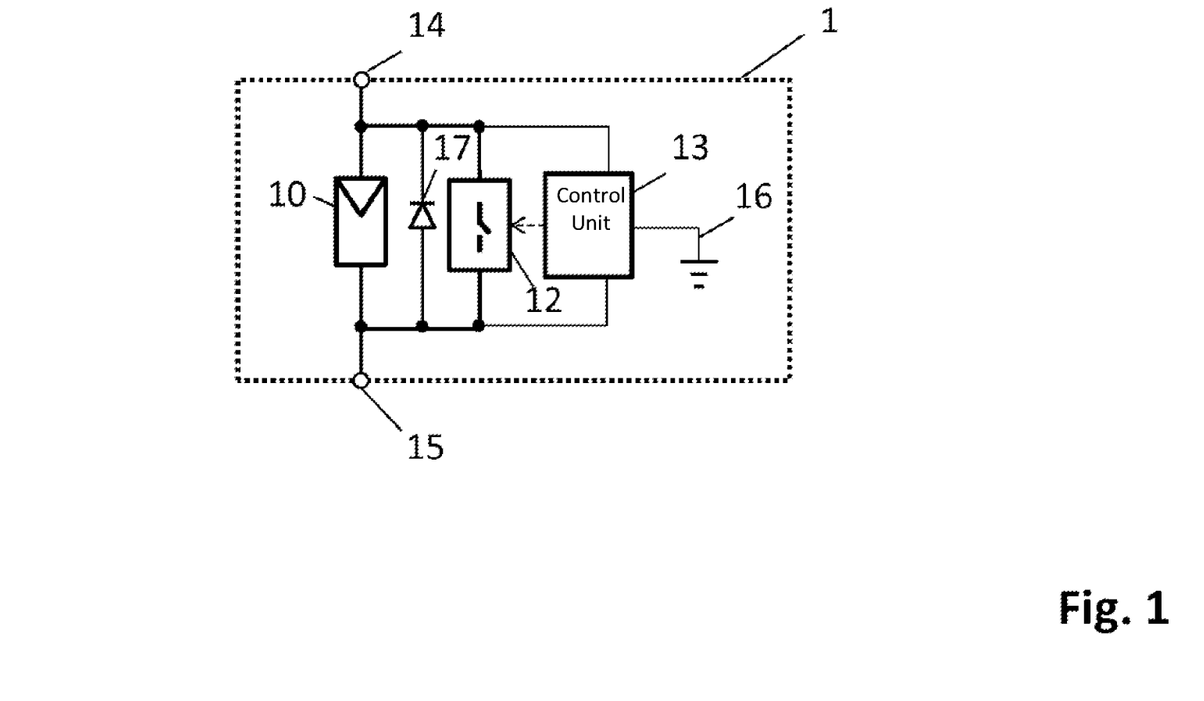
FIG. 1 shows a first embodiment of a solar module according to the disclosure.

FIG. 1 shows a solar module 1 according to the disclosure with a first module terminal 14 and a second module terminal 15. A single photovoltaic module 10 which converts sunlight into electrical DC power is arranged between the module terminals 14, 15. A diode 17 as a bypass diode and a control unit 13 are connected in parallel with the photovoltaic module 10, so that the control unit is powered electrically by the photovoltaic module 10 when operating. At the same time, a short-circuit switch 12, which is operated by the control unit 13, is also connected in parallel with the diode 17 and with the control unit 13. The control unit 13 can then open the short-circuit switch 12 at least when a buffer store integrated into the control unit 13, for example a capacitor, is discharged to the point that recharging via the photovoltaic module 10 is necessary. As an alternative to full opening, it is conceivable here that the short-circuit switch 12 is opened in a partially conducting mode only far enough that the capacitor can be recharged. Under operating conditions in particular in which the lowest possible voltage is desired between the module terminals 14, 15, the control unit 13 closes the short-circuit switch 12 during the time in which the control unit 13 can draw its energy for operation from the buffer store, so that the photovoltaic module 10 is short-circuited during this time, and substantially no voltage is present between the module terminals 14 and 15. In the absence of such an operating condition, the short-circuit switch 12 can, of course, also remain permanently open.

Figure 2:
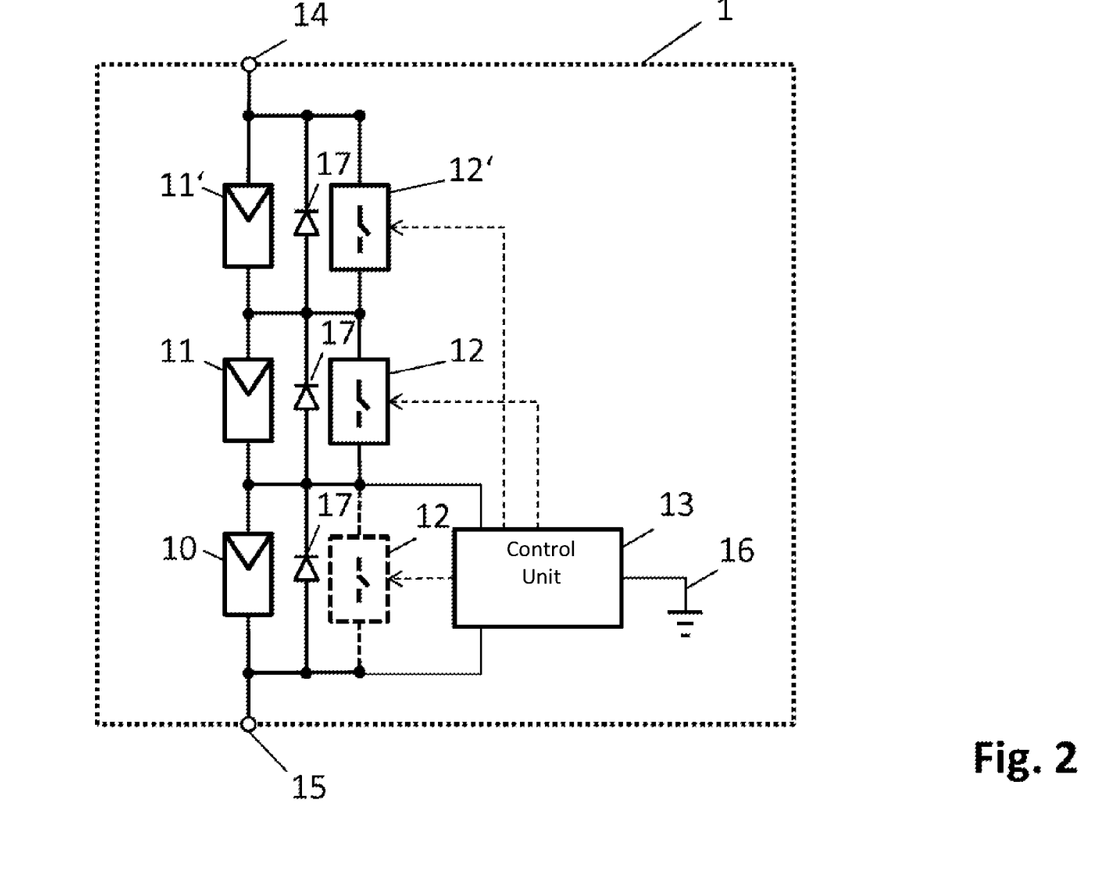
FIG. 2 shows a further embodiment of a solar module according to the disclosure.

FIG. 2 shows a solar module 1 in a further embodiment of the disclosure. A series connection of multiple partial modules 10, 11, 11' is arranged between the module terminals 14 and 15. A diode 17 as a bypass diode and a control unit 13 are connected in parallel with a first partial module 10, so that the control unit is powered electrically by the first partial module 10 when operating. A bypass diode 17 and a short-circuit switch 12, 12' are connected in parallel with each of the two further partial modules 11, 11'. The short-circuit switches 17 are here operated by the control unit 13 depending on voltages which the control unit 13 determines through a ground potential reference terminal 16 and through the connections to the first partial module 10.

The partial modules 10, 11, 11' can be formed by separate photovoltaic modules, or this may also be done through a number of solar cells within a PV panel. In one embodiment, the solar module is formed by a PV panel, so that the control unit 13 and the short-circuit switch 12 are integrated into the PV module. The ground potential reference terminal 16 can, in one embodiment, be connected to a frame of the PV panel, but can, for example, also be formed on frameless PV panels as a contact surface in the outer region of the PV panel, in front of which a connecting path to the ground potential is appropriately fabricated. The frame or the contact surface are then further connected to the ground potential with sufficiently low impedance, that is with an impedance that is lower in comparison to the impedance of the voltage determination in the control unit 13.

The control unit 13 determines, for example, a module voltage of the partial module 10 and an insulation voltage between the module terminal 15 and the ground potential reference terminal 16. The control unit 13 compares the module voltage and the insulation voltage with predetermined threshold values, and closes none, one, a plurality or all of the short-circuit switches 12, depending on a result of the comparison. For example, short-circuit switches 12 are closed when the insulation voltage exceeds a first threshold value, and are opened again when the insulation voltage has fallen below this threshold value.

The number of the further partial modules 11 with parallel short-circuit switches 12 can be one or also a number greater than one, wherein the short-circuit switches 12 can be controlled together or individually by the control unit 13. In one embodiment, the first partial module 10 is designed so that its voltage is as low as possible, but sufficient for the electrical power of the control unit 13, so that the total voltage of the solar module 1 is variable over a largest possible range. It is desirable in one embodiment to determine the module voltage only over partial modules that are not short-circuited by short-circuit switches, so that the actuation of a short-circuit switch 12 does not have a significant effect on the measured module voltage. It is, however, also alternatively possible to compensate computationally or in other ways for this effect, or for the short circuit to be repeatedly temporarily removed for measurement purposes. In this case, the voltage limitation for the series connection of a large number of solar modules within a solar field is retained if the voltage measurement is made with a stochastic offset, and the measurement duration is sufficiently short.

It is also conceivable that the control unit 13 is also fitted with an optional, parallel short-circuit switch 12 that can be controlled by the control unit 13. Similarly to the procedure described in association with FIG. 1, the control unit 13 can briefly open the short-circuit switch 12 that is in parallel with it at least whenever a recharging of a buffer store integrated into the control unit 13 is necessary to maintain the operation of the control unit 13. The measurement of the voltage of the partial module 10 takes place in this case while the short-circuit switch 12 that is connected in parallel with the control unit is open.

Figure 3:
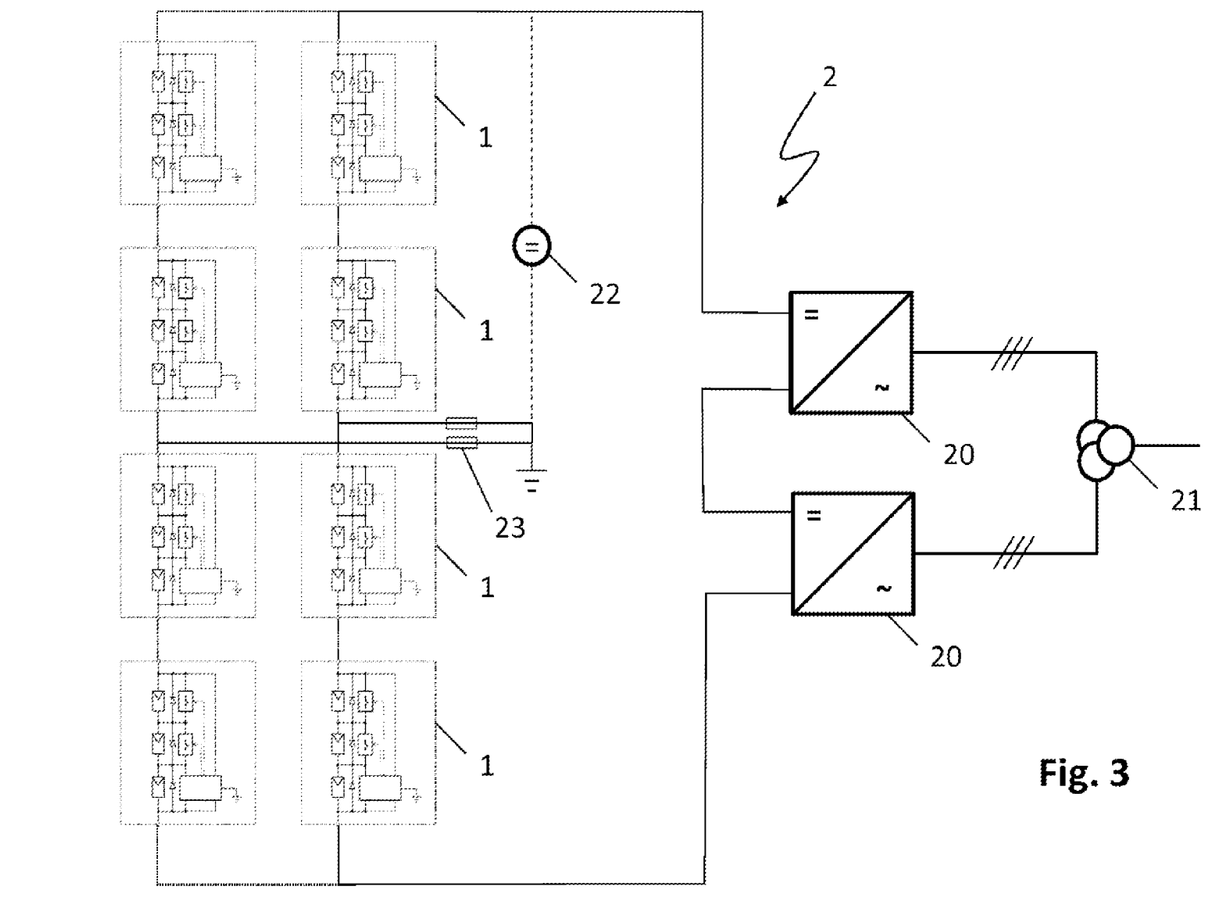
FIG. 3 shows a photovoltaic system with a series connection of solar modules according to the disclosure.

As is shown in FIG. 3, the solar modules 1 described above in a series connection can form a string of a photovoltaic system 2, wherein a plurality of strings can, in addition, be connected in parallel with one another. In one embodiment, the strings are each connected electrically at their center point via a fuse 23 or a circuit breaker to the ground potential, or a voltage source 22 is arranged between a string terminal and the ground potential, whose voltage is selected such that the center point of each string is located approximately at ground potential. In the latter case, a virtual grounding of the string is also spoken of, while the first case is referred to as hard grounding.

It is advantageous in both grounding variants to design the connection to the ground potential separably, so that a current flowing through this connection in the event of a ground fault can be interrupted. Fuses or protection switches can be provided in the connection for this purpose.

Figure 4:
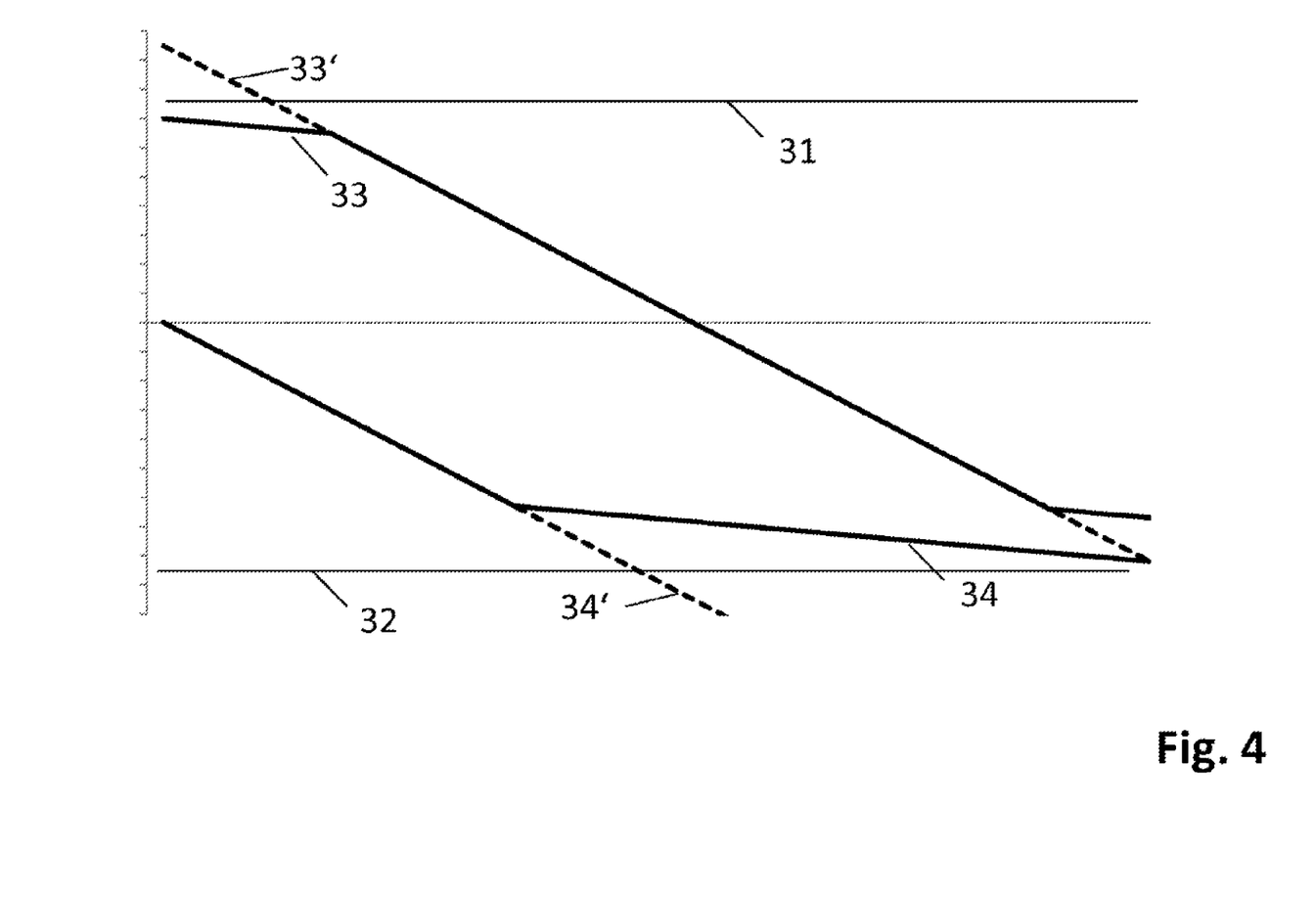
FIG. 4 shows voltage curves along a series connection of solar modules according to the disclosure.

Examples of voltage curves along a string resulting from the use of solar modules according to the disclosure are illustrated in FIG. 4. The voltages are each represented with reference to ground potential, so that in the case of a string without a ground fault, the voltage curve 33 reaches ground potential in the center of the string. A kink can be recognized at both ends of the string, which arises because the control units 13 of the solar modules 1 arranged there close the respective short-circuit switches 12 since the respective voltage criteria for short-circuiting are satisfied, and in the illustrated case each solar module only still exhibits a reduced residual voltage. This achieves observance of the upper voltage threshold 31 and the lower voltage threshold 32 with respect to ground potential at the two ends of the string, which would be exceeded without the partial short circuit of the solar modules 1 concerned, illustrated by the voltage curve 33'. In the region of the kink, only the partial modules 10 that are not short-circuited contribute to the string voltage and thus to producing energy, wherein the string, however, continues to contribute, with reduced power, to the energy production of the photovoltaic system 2.

If a ground fault arises, for example at the positive end of the string, the relationship of the center of the string to the ground potential is lost. In this example, the positive end of the string is instead located at ground potential. This creates the risk that the negative end of the string, without a partial short circuit of the solar modules, is located significantly below the lower voltage threshold, which is only further strengthened by a disconnection of the string from the inverter. As a result of the strong overvoltage of the voltage curve resulting without a short circuit 34' in the prior art, the insulation of the solar modules can be overloaded, whereby the solar modules would be damaged in the short or long term, which can lead to failure of the entire photovoltaic system. The solar modules 1 according to the disclosure bring about the voltage curve 34, wherein now the solar modules 1, starting from the region of the center of the string, reduce their voltage by the partial short circuit initiated by the respective control units 13 to such an extent that even the end of the string to be used remains above the lower voltage threshold 32, or only falls slightly below it. In general, the string may remain in use with reduced power even in this situation.

Through the appropriate selection of the first threshold value for the insulation voltage and of the second threshold value for the module voltage, a short-circuiting or partial short-circuiting of the solar modules along the course of the string is achieved in good time, so that the ends of the string do not infringe the permissible voltage limits, or only do so slightly, without the solar modules having to have knowledge of the voltage conditions prevailing at the end of the string. For example, for a string with 32 solar modules 1 connected in series and a no-load voltage of 3008 V for the string, corresponding to a no-load voltage of 10 V over the first partial string 10 of each solar module 1, it can be ensured with the following threshold values that the upper and lower voltage thresholds of the string of 1500 V or −1500 V with respect to ground potential are observed both with extreme solar irradiation as well as with an arbitrary ground fault:
first threshold value for the insulation voltage: 1250 V
second threshold value for the module voltage 71 V In one embodiment of the disclosure, the second threshold value is, in addition to a predetermined fixed value, further determined depending on the insulation voltage, in particular the second threshold value is reduced as the value of the insulation voltage rises. In this way it is ensured that the condition for a short-circuiting is already achieved in a solar module that is placed closer to the center of the string when, for example, the irradiation is high and/or the temperature of the solar modules 1 is low.

In these cases, the module voltage of the solar modules that are not affected by the short circuit is also higher, so that without adjusting the second threshold value, the end of the string would infringe the voltage limits.

It is furthermore advantageous to select the first and/or second threshold values depending on the placement of the solar modules 1 within the string, in order to guarantee observance of the voltage thresholds for a larger quantity of operating and fault states and/or to minimize the number of short-circuited solar modules 1.

Since the individual parameterization of the control units 13 simultaneously however entails an increased effort and expense, and is thereby associated with the possibility of a faulty setting of the threshold values, the individual parameterization can alternatively take place within a setting phase, during which it is ensured that there is no ground fault present in the photovoltaic system 2, and in which an adequate bandwidth of operating states is included. In one embodiment the control units 13 do not short-circuit the solar modules 1 during the setting phase. In the setting phase, respective pairs of values of the module voltage and the insulation voltage are acquired and stored by the control units 13 of the solar modules 1 concerned. In this way, a correlation between the values of the module voltage and the insulation voltage which is characteristic for the position of the solar module 1 can be determined. An example of the correlation is respectively shown in FIG. 5 for one solar module M1 in the negative voltage region with respect to ground potential near to the center of the string, and a solar module M2 in the region of the positive end of the string. The module voltage U1 is plotted here in the horizontal direction, and the insulation voltage U2 plotted in the vertical direction. The respective value pairs are here located along a straight line, whose gradient for the solar module M1 close to the center of the string exhibits a lower magnitude than for the solar module M2 in the region of the end of the string. The solar modules were not short-circuited in the example illustrated.

Figure 5:
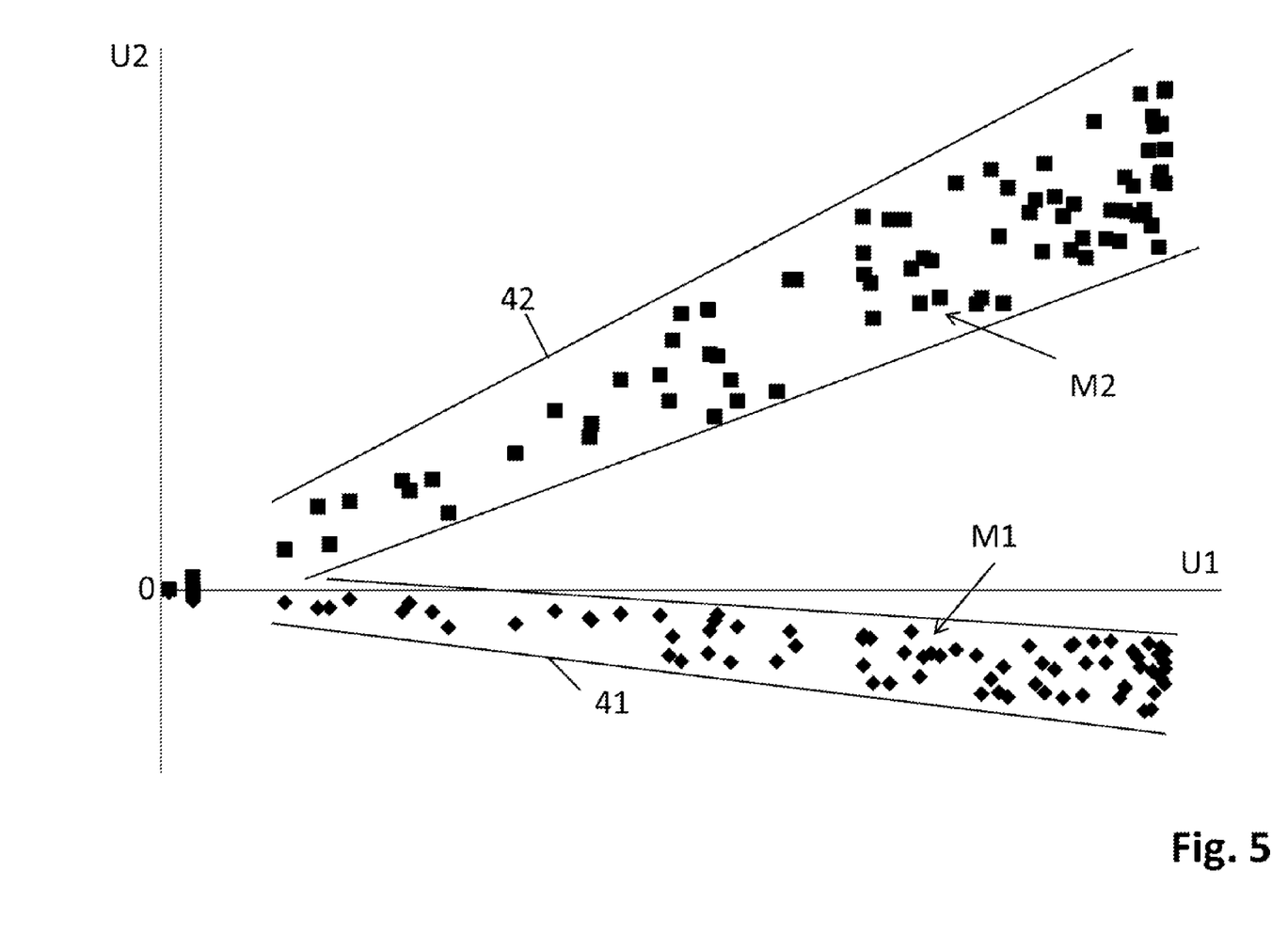
FIG. 5 shows a recording of voltage value pairs to illustrate a method of determination for threshold values to control of the solar modules according to the disclosure.

After the setting phase has been completed, the control units 13 can determine appropriate threshold values for the actuation of the short-circuit switches 12 on the basis of the gradient determined and/or on the basis of the range limits 41, 42, within which all the stored value pairs, or all value pairs, are located, with the possible exception of value pairs that can be recognized as highflyer. These range limits 41, 42 are used in the following period by the respective control unit 13 to check whether an actuation of the short-circuit switch 12 is required, since current value pairs are located outside the range limits. Alternatively to the upper and lower range limits of each solar module M1, M2, it is also possible for only the range limit with the greater absolute value to be used for checking.

The individual setting of the range limits and the corresponding threshold values is performed with the method described autonomously by each of the solar modules 1 concerned, without an exchange of values being necessary between the solar modules 1. The use of data communication between the solar modules 1 or between a solar module 1 and a further data unit, in particular for improved determination of the individual threshold values of the individual solar modules 1, is not, however, excluded, and can improve the method further. The data communication can, for example, take place over radio or via power line communication.

In one possible embodiment of the solar module 1 according to the disclosure, the partial short circuit is maintained after actuation of the short-circuit switch 12 as long as the electrical power supply of the control unit 13 is maintained. This is usually the case until the end of the day. In a further embodiment, the partial short circuit is maintained until a release signal is received by the solar module, or until the partial short circuit is ended through manual intervention at the solar module. A retention of the short circuit until the presence of a further, cancelling test criterion for the insulation voltage and/or the module voltage, or over a predetermined period of time, is also conceivable.

Alternatively, the short-circuiting can repeatedly be temporarily cancelled in order to determine whether the criteria for a short circuit are still present. In this case, the proportion of time or the length of time of the cancellation should be small, for example 1% of the time or less than 1 second in length. In a group of many solar modules, the contribution of the individual solar module to the total voltage is then uncritical, since the brief cancellation of the short-circuiting between the solar modules takes place in a temporally stochastic manner.

What is claimed is:

1. A solar module, comprising:
   one or more photovoltaic (PV) modules;
   a short-circuit switch connected in parallel with at least one of the one or more PV modules; and
   a control unit connected in parallel with the short-circuit switch,
   wherein at least one of the one or more PV modules supplies electrical power to the control unit and is connectable via a first and a second module terminal to further solar modules to form a string, and
   wherein the control unit is configured to actuate the short-circuit switch depending on an insulation voltage dropped between a ground potential reference terminal of the solar module and one of the first and second module terminals.

2. The solar module as claimed in claim 1, wherein the control unit is furthermore configured to actuate the short-circuit switch depending on a module voltage dropped across the first and second module terminals.

3. The solar module as claimed in claim 1, wherein the solar module comprises a series connection of a first partial PV module and a second partial PV module, wherein the short-circuit switch is connected in parallel with the second partial PV module and the control unit is connected in parallel with the first partial PV module.

4. The solar module as claimed in claim 3, further comprising an additional short-circuit switch operated by the control unit connected in parallel with the first partial PV module.

5. The solar module as claimed in claim 3, wherein the series connection comprises at least one further partial PV module, with which a further short-circuit switch is connected in parallel, and wherein the control unit is configured to actuate selectively the further short-circuit switch depending on the insulation voltage and a module voltage dropped across the first and second terminals.

6. The solar module as claimed in claim 1, wherein a first threshold value is stored in the control unit, and wherein the control unit is configured to close the short-circuit switch when the insulation voltage exceeds the first threshold value.

7. The solar module as claimed in claim 6, wherein a second, different threshold value is stored in the control unit, and wherein the control unit is configured to close the short-circuit switch when the module voltage exceeds the second, different threshold value.

8. The solar module as claimed in claim 7, wherein the control unit is configured to adjust one of the first and second threshold values depending on the other one of the first and second threshold values.

9. A photovoltaic system comprising a series connection of solar modules, wherein at least one of the solar modules comprises:
   one or more photovoltaic (PV) modules;
   a short-circuit switch connected in parallel with at least one of the one or more PV modules; and
   a control unit connected in parallel with the short-circuit switch,
   wherein at least one of the one or more PV modules supplies electrical power to the control unit and is connectable via a first and a second module terminal to further solar modules to form a string, and
   wherein the control unit is configured to actuate the short-circuit switch depending on an insulation voltage dropped between a ground potential reference terminal of the solar module and one of the first and second module terminals.

10. An operating method for a solar module with two module terminals through which the solar module is connectable to further solar modules to form a string, and a ground potential reference terminal, comprising:

measuring an insulation voltage between the ground potential reference terminal of the solar module and one of the two module terminals by means of a control unit; and short-circuiting at least a part of the solar module by means of the control unit selectively activating a short-circuit switch depending on the insulation voltage, wherein the control unit is electrically powered by the solar module.

11. The operating method as claimed in claim 10, further comprising:

measuring a module voltage between the module terminals by means of the control unit, and short-circuiting at least a part of the solar module by means of the control unit selectively activating a short-circuit switch depending on the module voltage.

12. The operating method as claimed in claim 11, wherein the control unit is configured to distinguish between at least three conditions depending on the insulation voltage and the module voltage, wherein in a first condition, no short-circuiting of the solar module takes place, in a second condition, the short-circuiting of a part of the solar module takes place, and in a third condition, the short-circuiting of the entire solar module takes place.

* * * * *